United States Patent [19]

Yates

[11] Patent Number: 5,756,184

[45] Date of Patent: May 26, 1998

[54] GEL CUSHION

[76] Inventor: Paul M. Yates. 5814 Briar Tree Dr., La Canada, Calif. 91011

[21] Appl. No.: 838,883

[22] Filed: Apr. 14, 1997

Related U.S. Application Data

[62] Division of Ser. No. 652,692, May 30, 1996, Pat. No. 5,679,193.
[51] Int. Cl.⁶ .................................................... B32B 3/20
[52] U.S. Cl. ............................................. 428/188; 602/21
[58] Field of Search ................................ 428/188; 602/21

[56] References Cited

U.S. PATENT DOCUMENTS 5,340,352 8/1994 Nakanishi et al. ..................... 450/57

*Primary Examiner*—Christopher Raimund

*Attorney, Agent, or Firm*—Walter A. Hackler

[57] ABSTRACT

A wrist support gel cushion having a fabric upper surface and an adhesive gel lower surface, and a method of manufacturing same, in accordance with the present invention generally includes the steps of coating one side of a stretchable fabric with a thermoplastic gel, placing the coated fabric on a mold adapted for vacuum forming, applying a vacuum between the coated fabric and the mold, injecting an additional volume of the thermoplastic gel onto an exposed fabric surface during the vacuum forming, allowing the gel to set and solidify and removing the solidified gel having the fabric fixed thereto in order to obtain the wrist support gel cushion. The method may also include the step of depositing air filled bags or balloons on the coated fabric prior to injecting the additional gel in order to make a gel cushion having voids therein. The voids enhance the ability of the gel cushion to adhere to surfaces disposed at sharp angles to one another.

9 Claims, 1 Drawing Sheet

GEL CUSHION

This application is a division, of application Ser. No. 08/652,692, filed May 30, 1996 now U.S. Pat. No. 5,679,193.

The present invention generally relates to a method of making gel cushions, and more particularly relates to both a method of making seamless, vacuum-molded, wrist support gel cushions, and gel cushions manufactured by such a method.

A recent surge in the number of wrist and arm occupational injuries, resulting from repetitive computer keyboard use, has prompted the development of countless devices directed at alleviating this modern problem. "Carpal Tunnel Syndrome" has become a well known term describing a group of symptoms, including tendinitis, and epicondylitis, that occurs as a result of repetitive flexion of the wrist joints. Not only are the symptoms of Carpal Tunnel Syndrome extremely painful, they have the potential to be permanently debilitating. Fortunately, it has been found that if the causes of the disease are minimized or eliminated in time, further damage therefrom may be averted.

Wrist wraps, directed at immobilizing the wrist joint, and wrist supports, directed at propping the hand at a position which minimizes repetitive wrist flexion, have been heretofore developed. These devices are used extensively by data entry personnel and other keyboard operators in order to prevent wrist and arm injuries.

The present invention is directed at an inexpensive method for manufacturing gel cushions that may be used as highly effective, comfortable wrist supports. In a broad sense, the method may be used to produce gel cushions for other uses.

Some prior art wrist supports, though designed to minimize repetitive wrist flexion, tend to be uncomfortable to use after a period of time. Notably, because such devices are typically positioned for supporting the underside of a user's wrist, flow of blood may be impeded by the use of rigid, non-yielding material.

Thus, a number of prior art wrist supports are comprised of softer, more comfortable materials, such as foam rubber. Unfortunately, the resiliency of foam rubber, and other similar cellular materials, tends to diminish after extended periods of use. Furthermore, foam rubber tends to wear unevenly, resulting in hardened areas where compression is most regularly applied. Thus, foam rubber supports become less comfortable with time, necessitating frequent replacement thereof.

Cushioning devices having liquid or gel filled bladders have been developed in the attempt to provide a more comfortable, more durable support for the wrist than is possible with solid or foam rubber supports. For example, U.S. Pat. No. 5,435,508 discloses a wrist rest support comprising a viscous, fluid-filled bladder removably inserted in a machine washable outer covering.

This prior art device, and others which are similar thereto, are manufactured by several independent steps, including sewing or other means of assembling the bladder, filling the bladder with the desired liquid, sealing the bladder such that it will resist leakage, and fashioning an outer covering in which to enclose the liquid filled bladder.

The present invention provides a substantially less complicated process for manufacturing a comfortable fabric covered cushion that includes all the advantages of a liquid support medium. Although the method of the present invention produces a fabric covered gel-cushion, no sewing, sealing or gluing is required in the process of making the cushion.

Notably, because a gel cushion manufactured in accordance with the present invention does not include a fluid filled bladder, there is no possibility that jewelry worn by the operator will rupture the cushion and cause leakage of its contents.

Furthermore, a gel cushion in accordance with the present invention is seamless due to the unique method of manufacturing same, thus eliminating the possibility of the cushion snagging delicate clothing that may be worn by the keyboard operator.

A gel cushion made in accordance with the method of the present invention will adhere to any typical surface on which it is placed, for example, a desktop. This eliminates potential frustration suffered by a keyboard operator who must contend with a wrist support that migrates and slips along the desktop due to the natural movement of the operator's hand and arm. Notably, the gel cushion requires no additional components to affix, clamp or secure the cushion to a surface. The cushion may be quickly and easily removed, and its position readjusted as desired, for example, when being used by more than one user.

Overall, the present invention provides an inexpensive method of manufacturing a comfortable, durable gel cushion.

SUMMARY OF THE INVENTION

A method for manufacturing a gel cushion having fabric upper surface and an adhesive lower surface, in accordance with the present invention, generally comprises the steps of first coating one side of a porous, stretchable fabric with gel, more particularly a gelable liquid, in order to make the fabric resistant to the passage of air therethrough, and next disposing the fabric over a mold adapted for vacuum forming the fabric. A vacuum is then applied between the coated fabric and the mold in order to cause intimate contact between an uncoated side of the fabric and the mold. Smooth, creaseless contact between the mold and the fabric is made possible by the stretching property of the fabric.

While the vacuum is being applied, an additional volume of gel is deposited on the coated side of the fabric in order to cause bonding between the additional volume of gel and the fabric. Preferably, the additional volume is sufficient to substantially fill the mold. The gel is allowed to solidify and finally, the solidified gel, having the fabric fixed thereto, is removed from the mold in order to obtain the gel cushion for use as a wrist rest or other cushion device having a fabric upper surface and a removably adhesive gel lower surface.

In addition, the method may include the step of removing extraneous portions of solidified gel along edges of the mold, in order to produce a smooth, attractive gel cushion. This step may be accomplished by pressing a rigid mat flat against the mold such that the extraneous portion is pinched between the rigid mat and the edges of the mold and cut away from the balance of the solidified gel. Upon contact with the mat, the solidified gel will adhere thereto. Thus, the gel cushion may be removed from the mold by lifting the rigid mat and subsequently peeling the gel cushion from the mat.

Furthermore, the gel cushion may be produced with air pockets, or voids, within the solidified gel in order to enable the gel cushion to adhere to surfaces disposed at sharp angles to each other. Such voids may also be produced in order to increase softness of the cushion. Particularly, air filled balloons, or hollow bags, made of gel or other flexible material may be placed in the mold prior to the depositing of the gel in the mold. Upon the gel solidifying, the gel cushion will include air pockets formed by the balloons.

3

Although the present invention is well suited for producing gel cushions to be used as wrist supports, it should be appreciated that the invention may be used to produce other cushion forms. Furthermore, the present invention encompasses a gel cushion made in accordance with the method briefly described hereinabove.

BRIEF DESCRIPTION OF THE DRAWINGS

The present invention may be more clearly understood with reference to the following detailed description, in conjunction with the appended drawings of which.

DETAILED DESCRIPTION

Figure 1:
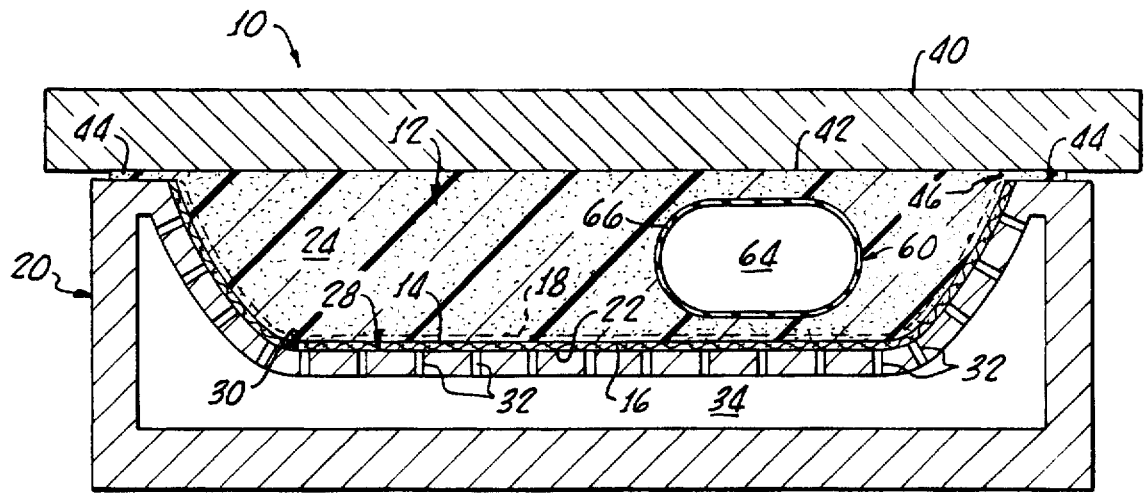
FIG. 1 shows apparatus suitable for practicing a method for manufacturing a gel cushion having a fabric upper surface and an adhesive lower surface, in accordance with the present invention.

Turning now to FIG. 1, an apparatus 10 suitable for manufacturing a wrist support gel cushion 12 in accordance with the method of the present invention is shown in cross section. The method generally comprises the steps of coating one side 14 of a stretchable fabric 16 with gel 18; disposing the fabric 16 over a mold 20; applying a vacuum between the fabric 16 and the mold 20 in order to cause intimate contact between an uncoated side 22 of the fabric 14 and the mold 20; depositing an additional volume 24 of the gel in a liquid state over the coated side 14 of the fabric 16 during the application of the vacuum; allowing the additional volume 24 to solidify and adhere to the gel coating 18; and removing the solidified gel 24 and adhered fabric 16 from the mold in order to obtain a gel cushion 12.

Particularly, the fabric 16 may be a porous, four way stretch fabric, made of an elastomeric thread, preferably a segmented polyester-polyurethane, like that sold under the trade name "Lycrae®", available from I.E. Dupont de Nemours and Company. It should be appreciated that many other types of porous, stretchable materials, including porous films, may be used in the method of the present invention.

The gel coating 18, and the additional volume 24 both comprise a soft, easily molded composition. More particularly, the gel 18, 24 may comprise a thermoplastic compound having low fluid viscosity at elevated temperatures that can be injection molded and thereafter cooled to produce a rubbery, elastic gel, for example a thermoplastic elastomer.

After the step of coating the fabric 16, the fabric 16 is disposed over the mold 20, said mold 20 being adapted for vacuum forming the fabric 16. Importantly, the fabric 16 is disposed over the mold 20 such that the uncoated side 22 is placed in contact with the mold 20, or more specifically, a molding surface 28 having a selected contour 30. Thus, the gel coated side 16 will be exposed during this step. In other words, the gel coated side 16 will face away from the molding surface 28.

The mold 20 may be adapted for vacuum forming in any suitable, conventional manner. For example, the mold 20 may include vacuum ports 32 through the molding surface 28 and in communication with a hollowed cavity 34 to which a vacuum may be applied. The molding surface 28 is preferably elongated in shape, and the selected contour 30 thereof may be generally flat, curved or arcuate in form,

4 depending upon the particular application of which the gel cushion 12 is to be used.

After placement of the fabric 16 over the mold 20, a vacuum is applied between the fabric 16 and the mold 20. Importantly, the gel coating 18 renders the porous fabric 16 impermeable, or resistant, to the passage of air therethrough. Consequently, the fabric 16 is vacuum moldable even when fibers thereof (not shown) are substantially stretched apart.

In addition, the elasticity of the gel enables substantial stretching of the gel coating 18 without deterioration or breakage thereof, which would cause the coated fabric 16 to become air permeable, and thus resistant to vacuum forming. In effect, the present invention enables the fabric 16 to be optimally stretched and vacuum molded, thus creating a smooth, creaseless fabric surface defined by the selected contour 30 of the mold 20.

The vacuum may be applied in any suitable fashion. For example, a vacuum device (not shown) may be applied to evacuate the cavity 34, and consequently create a vacuum between the coated fabric 16 and the molding surface 28. Thus, the fabric 16 becomes four way stretched and forced into intimate contact with the molding surface 28.

During application of the vacuum, the additional volume of gel 24 is deposited onto the fabric coating 18, by pouring or injecting said additional volume 24 into the mold 20. Upon contacting the gel coating 18, the additional volume 24 will partially melt and bond therewith.

As hereinabove noted, the gel used for both the coating 18 and the additional volume 24 is preferably a thermoplastic elastomer and thus molded at an elevated temperature and then allowed to cool and set. Molding processing temperature will depend upon the particular thermoplastic composition being used, but will generally range from about 300 degrees Fahrenheit to about 500 degrees Fahrenheit or more.

After the additional volume 24 is deposited on the fabric coating 18, the total volume of gel 18, 24 is allowed to solidify. The solidified gel 18, 24 provides means for supporting the fabric 16 in the selected contour 30. Actual setting time will depend upon the particular gel composition being used and the particular cooling means employed. The gel 18, 24 may be water cooled to produce rapid and uniform heat removal in order to minimize cycle time.

The completed gel cushion 12 is now ready for removal from the mold 20. The step of removing the solidified gel 18, 24 and the coated fabric 16 fixed thereto may be performed by placing a rigid mat 40 flat against the mold 20 in order to cause contact between the rigid mat 40 and an exposed surface 42 of the solidified gel 24. The tackiness of the solidified gel 24 will cause it to adhere to the rigid mat 40, and thus upon lifting the mat 40 from the mold 20, the gel cushion 12 is lifted as well.

Next, the gel cushion 12 may be manually or otherwise peeled from the mat 40 and subsequently used, for example, as a wrist support. The final gel cushion 12 will have a soft fabric upper surface 22, vacuum formed in the selected contour 30, and an exposed lower M9 surface 42 of gel for enabling removable fastening of the gel cushion 12 to a selected surface, such as for example, a desktop (not shown).

Notably, the present invention may include the step of removing any extraneous portions 44 of solidified gel 18, 24, for example, by cutting the extraneous portion 44 from the balance of the gel cushion 12. Preferably, in the depositing step, the additional volume 24 is sufficient to substantially or completely fill the mold 20 to capacity. This aids in easy removal from the mold 20 and the making of an attractive, uniform gel cushion 12. Thus, it is likely that in an attempt to fill the mold with the additional volume 24 of gel, the mold may be overfilled, thus creating the extraneous portions 44, such as runners of excess gel along mold edges 46. Any extraneous portion 44 may be cut from the balance of the gel cushion 12 while still in the mold 20.

Preferably, the step of cutting is included in the step of pressing the rigid mat 40 flat against the filled mold. Particularly, the rigid mat 40 may be pressed with sufficient force such that the extraneous portion 44 of solidified gel is pinched between said mold edge 46 and the rigid mat 40, and severed from the balance of the gel 18, 24. Notably, any removed extraneous portion 44 of gel may be recycled and used in the processing of another gel cushion, by melting the extraneous portion 44 back to a low viscosity state.

Another feature of the present invention is the optional step of positioning on the coated fabric 16 within the mold 20, one or more hollow balloons, or bags 60, made of a flexible material in order to form one or more air pockets, or voids 64, in the completed gel cushion 12.

More particularly, the hollow bag 60 is positioned in a desired fashion upon the coated fabric 16 during the vacuuming step. While the hollow bag 60 is so positioned, the additional gel 24 is deposited on the coated fabric 16 such that the hollow bag 60 is substantially surrounded by gel 24. The gel 18, 24 is then allowed to solidify as described above.

The hollow bag 60 is preferably comprised of a material capable of bonding with the gel 18, 24. More particularly, the hollow bag 60 may be made of the same gel used for the coating 18 and additional volume 24 described above. In this case, preferably walls 66 of the bag 60 are sufficiently thick to resist perforation by melting upon contact with the hot additional volume of gel 24. Air trapped inside the hollow bag 60 will temporarily expand due to the heat contained in the gel 24 poured around the bag 60, but the resilience and elasticity of the bag walls 66 enable substantial expansion without bursting thereof.

Figure 2:
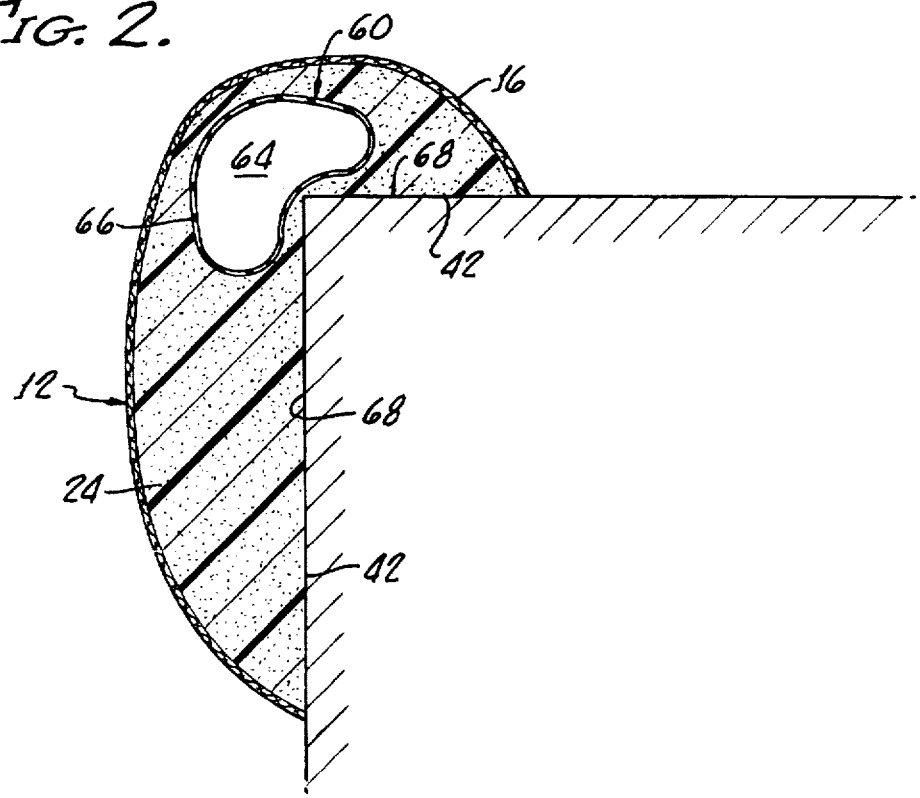
FIG. 2 shows a gel cushion having a void therein, in accordance with the present invention, in order to enable said gel cushion to adhere to surfaces disposed at angles to each other.

Turning now to FIG. 2, a gel cushion 12 is shown including one such void 64 therein. As shown, the void 64 provides means for enabling the gel cushion 12 to be bent, or flexed, sharply around angled surfaces 68, while maintaining an ability of the gel cushion 12 to adhere thereto. For example, the gel cushion 12 may be used as a safety bumper, or guard, on a corner of table, desk, computer or the like. Without the void 64 therein, the gel cushion may tend to spring apart from its position on an angled surface 68 due to the rubberiness of the gel 18, 24.

The voids 64 formed in the gel cushion 12, by the hereinabove described method, also tend to enhance softness of the gel cushion 12 and thus may increase comfort of some persons using the cushion 12.

Although there has been hereinabove described a gel cushion and a method of manufacturing same, in accordance with the present invention, for the purposes of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A wrist support gel cushion produced by:
    coating one side of a stretchable fabric with gel in order to make said fabric resistant to passage of air therethrough;
    disposing the coated fabric over a mold adapted for vacuum forming the coated fabric;
    applying a vacuum between the coated fabric and the mold to cause intimate contact between another side of the coated fabric and the mold by stretching of the fabric;
    depositing an additional volume of said gel on the fabric coating while the vacuum is being applied in order to cause bonding between the additional volume and the coated fabric;
    allowing the additional volume of gel to solidify; and
    removing the solidified gel and the coated fabric fixed thereto from the mold, in order to obtain said wrist support gel cushion.

2. The wrist support gel cushion according to claim 1 wherein the process further comprises removing an extraneous portion of the solidified gel before the removing of the solidified gel and coated fabric.

3. The wrist support gel cushion according to claim 2 wherein the removing of the extraneous portion of solidified gel is performed by cutting the solidified gel along an edge of the mold.

4. The wrist support gel cushion according to claim 3 wherein the cutting includes pressing a mat flat against the mold such that the extraneous portion of solidified gel is pinched between said mold edge and the mat.

5. The wrist support gel cushion according to claim 4 wherein the removing of the solidified gel and fabric fixed thereto includes lifting the mat, having the solidified gel adhered thereto, from the mold and subsequently peeling the gel cushion therefrom.

6. The wrist support gel cushion according to claim 1 wherein the process further includes the step of positioning, within the mold, a hollow bag made of a flexible material capable of bonding with the gel, in order to form a void in the gel cushion, the step of positioning the hollow bag performed after the step of disposing the coated fabric and before the step of depositing an additional volume of the gel.

7. A gel cushion comprising:
    a stretchable fabric having a selected contour, said fabric being vacuum formed by the process of applying a vacuum between the fabric and a mold having said selected contour; and
    gel means for both supporting the fabric in the selected contour and for enabling removable fastening of the gel cushion to a selected surface, said gel means produced by
    coating one side of the fabric with a gel in order to prevent passage of air through the fabric and enable vacuum forming thereof;
    depositing an additional volume of the gel on another side of the fabric during the vacuum forming of the fabric in order to substantially fill the mold and cause bonding between the fabric and the gel, allowing the gel to solidify, and removing the gel from the mold.

8. The gel cushion according to claim 7 further comprising means for forming a void within the gel cushion, said means for forming a void comprised of a hollow bag made of a flexible material capable of bonding with the gel.

9. The gel cushion according to claim 7 further comprising means, including at least one void in said gel, for enabling bending of the gel cushion around angled surfaces while maintaining an ability of the gel cushion to adhere to said angled surfaces.

* * * * *